United States Patent [19]
Lailach et al.

[11] Patent Number: 5,061,472
[45] Date of Patent: Oct. 29, 1991

[54] PROCESS FOR THE CONCENTRATION OF SULPHURIC ACID CONTAINING METAL SULPHATES

[75] Inventors: Günter Lailach; Rudolf Gerken, both of Krefeld, Fed. Rep. of Germany

[73] Assignee: Bayer Aktiengesellschaft, Leverkusen, Fed. Rep. of Germany

[21] Appl. No.: 562,094

[22] Filed: Aug. 1, 1990

[30] Foreign Application Priority Data

Aug. 23, 1989 [DE] Fed. Rep. of Germany ....... 3927751

[51] Int. Cl.$^5$ .......................... C01B 17/90; B01D 1/00
[52] U.S. Cl. .................................. 423/531; 423/522; 423/DIG. 2; 159/47.1
[58] Field of Search ............... 423/526, 531, 529, 530, 423/525, 527, 528, 522

[56] References Cited

U.S. PATENT DOCUMENTS

| | | | |
|---|---|---|---|
| 3,948,624 | 4/1976 | Fornoff et al. | 423/522 |
| 4,157,381 | 6/1979 | Bodenbenner et al. | 423/531 |
| 4,194,952 | 3/1980 | Bodenbenner et al. | 423/527 |

FOREIGN PATENT DOCUMENTS

| | | |
|---|---|---|
| 133505 | 2/1985 | European Pat. Off. . |
| 194544 | 3/1986 | European Pat. Off. ............ 423/526 |
| 972412 | 7/1959 | Fed. Rep. of Germany . |
| 940656 | 8/1959 | United Kingdom . |

Primary Examiner—Gary P. Straub
Assistant Examiner—Timothy C. Vanoy
Attorney, Agent, or Firm—Sprung Horn Kramer & Woods

[57] ABSTRACT

A process for the recovery of sulphuric acid from waste acids containing metal sulphates by evaporative concentration and separation of the metal sulphates from the suspension obtained by evaporation, the improvement wherein vapors leaving the evaporators together with droplets of sulphuric acid containing metal sulphates and solid metal sulphates are condensed by direct contact with cooled contaminated vapor condensate, cooling of this vapor condensate which is circulated as cooling medium is carried out in a flash evaporator and the vapors leaving the flash evaporator free from metal sulphates and sulphuric acid are directly or indirectly condensed by means of cooling agent.

8 Claims, 1 Drawing Sheet

PROCESS FOR THE CONCENTRATION OF SULPHURIC ACID CONTAINING METAL SULPHATES

This invention relates to a process for the recovery of sulfuric acid from dilute acids containing metal sulfates by evaporative concentration in vacuum evaporators and separation of the metal sulfates from the suspensions obtained in the process of evaporation.

BACKGROUND OF THE INVENTION.

It is known that dilute sulfuric acid containing metal sulfates, in particular so called waste acid from the sulfate process for the production of titanium dioxide, can be concentrated by multi-stage vacuum evaporation until the metal sulfates become substantially insoluble and can be separated from a 62 to 70% sulfuric acid which is returned to the process (EP-A 133 505). This process is, however, accompanied by losses of sulfuric acid and metal sulfates leading to contamination of the vapor condensate.

These losses must be reduced in view of the increasingly more stringent standards applied to the quality of effluent.

Precipitation of calcium sulfate and metal hydroxides from the vapor condensate by the addition of calcium compounds results in highly diluted suspensions which are difficult to filter. The filter cake has to be deposited which additionally results in environmental problems.

SUMMARY OF THE INVENTION

It should therefore be a primary object in the process of sulfuric acid concentration by evaporation to avoid contamination of the condensated water vapor with metal sulfates containing sulfuric acid droplets containing metal sulfates. Attempts to separate these droplets from the water vapor by means of a mist eliminator before vapor condensation, however, gives rise to major problems because the solid metal sulfates tend to stick to the mist eliminator and may thereby seriously interfere with the process.

These problems are made worse by the fact that the metal sulfates, in particular iron sulfate monohydrate are difficult to dissolve in cold water but the water which may be sprayed into the mist eliminators in the course of the process for washing purposes immediately cools to 25°-45° C. at the pressure of 30 to 100 mbar required for vacuum concentration of sulfuric acid to about 70%. Under these conditions, the mist eliminators can only be kept in operation with relatively large quantities of water but the evaporation of the contaminated washing water impairs the process because it takes evaporation capacity and additional energy.

It is an object of the present invention to recover sulfuric acid from waste acids containing metal sulfates by evaporative concentration in a vacuum and separation of the metal sulfates from the suspension obtained by evaporation, this evaporative concentration being carried out as far as possible without contamination of the vapor condensate by sulfuric-acid and metal sulfates in order to avoid the necessity for chemical treatment of the vapor condensate and hence production of solid waste material. It is another major object of this invention to provide a process which can be carried out trouble free.

To achieve the objects according to the invention, the vapors leaving the evaporators together with droplets of sulfuric acid containing metal sulfates and solid metal sulfates are condensed by direct contact with cooled contaminated vapor condensate, cooling of this vapor condensate which is circulated as cooling medium is carried out in a flash evaporator and the vapors leaving the flash evaporator free from metal sulfates and sulfuric acid are directly or indirectly condensed by means of cooling water. This process is the subject of the present invention. A quantity of water corresponding to 1 to 20% of the quantity of water contained the evaporated vapors is fed into the circulation of the contaminated vapor condensate and a corresponding quantity in which the contaminating metal sulfate and sulfuric acid are concentrated by a factor of 5 to 100 compared with the vapors leaving the evaporators is discharged from this circulation. Thus a small quantity of 1 to 30%, preferably 5 to 30% sulfuric acid containing metal sulfates is removed from the circulation of vapor condensate as contaminated vapor condensate and is returned to the evaporator system together with the waste acid which is to be concentrated by evaporation.

Although chemical treatment of this concentrated vapor condensate would be possible and would be advantageous compared with treatment of the unconcentrated contaminated vapor condensate, it must be rejected in favor of returning the condensate to the evaporator for the sake of the ecological aims of this invention.

In order to avoid contamination of the vapors leaving the flash evaporator by metal sulfates and sulfuric acid, these vapors are advantageously passed through a mist eliminator. Since the concentration of metal sulfates and sulfuric acid in the circulation of concentrated vapor condensate is kept within such limits according to this invention that all the metal sulfates are in solution, trouble free operation of the evaporator plant is ensured in spite of the presence of mist eliminators. It is preferable to add defoaming agents such as sulfonated fatty acids or tri-n-butyl phosphate in the circulating vapor condensate, in which case mist eliminators may be unnecessary.

The process according to the invention results in a very pure vapor condensate since the water evaporated from the waste acid is re-evaporated in a flash evaporator after condensation in a vapor condenser I without significant additional expenditure of energy and is then condensed in another vapor condenser II. Depending on the temperature of the available cooling water, vapor condensation in condenser II may be carried out by direct cooling with cooling water, in which case the vapor condensate is discharged as effluent together with the heated cooling water or by indirect cooling with cooling water, so that the pure vapor condensate can be used again.

It is another object of this invention to optimize the process while at the same time minimizing the contamination of effluent. This object is achieved in multi-stage evaporators by carrying out the above described treatment of the vapors only in those stages of evaporators in which the water is evaporated from suspensions of metal sulfates in sulfuric acid. In evaporator stages in which the sulfuric acid which is to be concentrated by evaporation only contains dissolved metal sulfates, contamination of the vapors with sulfuric acid and metal sulfates is sufficiently avoided in accordance with this invention by adding defoamants to the sulfuric acid and/or passing the vapors to the condenser by way of mist eliminators.

BRIEF DESCRIPTION OF THE DRAWING

The invention will now be described with reference to the FIGURE which is a schematic representation of only one possible embodiment.

DESCRIPTION OF THE PREFERRED EMBODIMENTS

Figure 1:
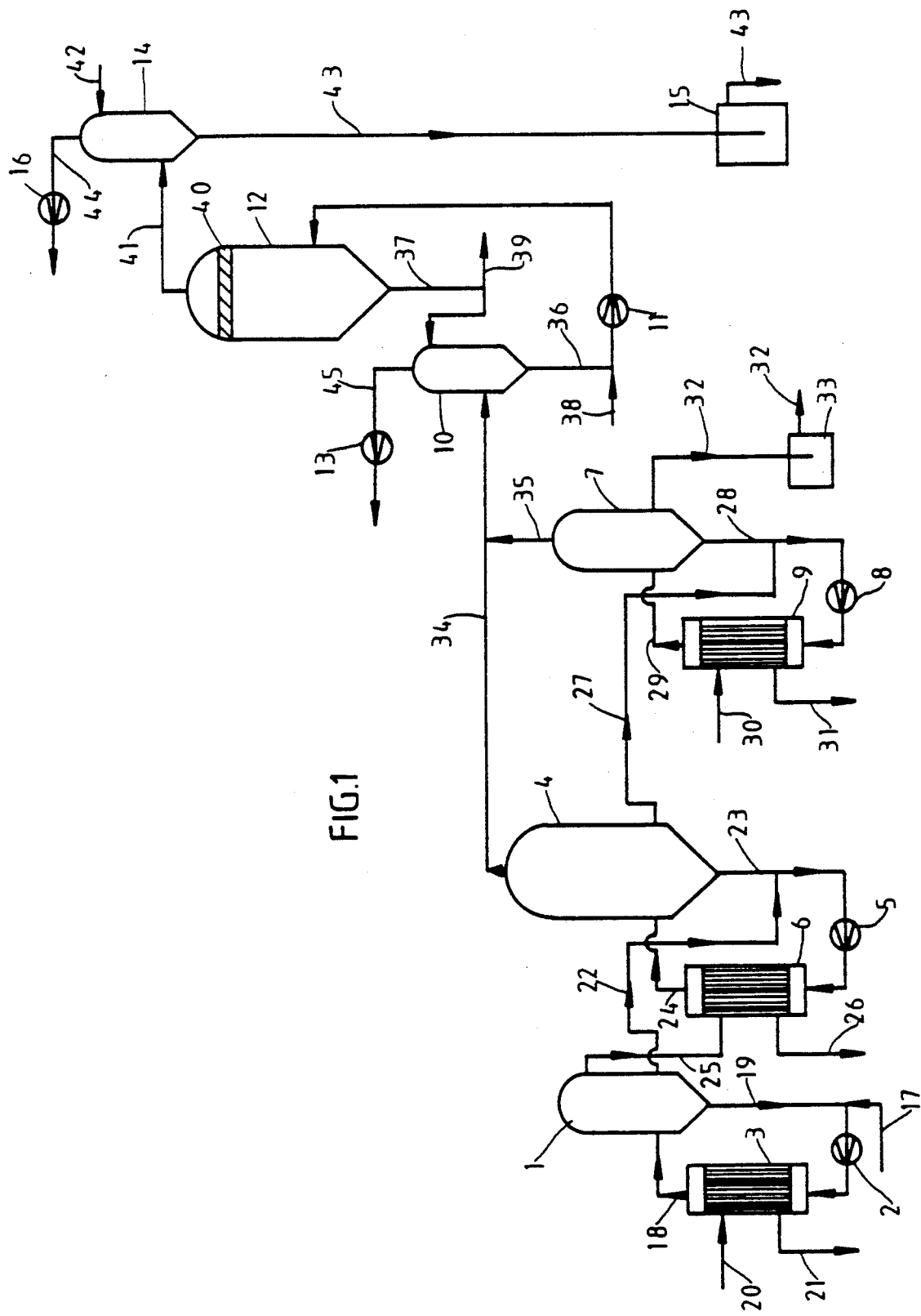

The first evaporator stage consists of a flash evaporator 1, a circulating pump 2 and a heat exchanger 3. Waste acid 17 containing from 18 to 30% by weight of $H_2SO_4$ and from 5 to 20% by weight of $MeSO_4$ is fed into the circulating acid 19. The pump 2 conveys the acid through the heat exchanger 3 where it is heated with steam 20. The steam condensate 21 may be used for preheating the waste acid 17. The circulating acid 18 which has been heated to 80°–150° C. is concentrated in the flash evaporator 1 by the evaporation of water and cooled. A quantity of concentrated sulfuric acid 22 corresponding to the amount of waste acid fed in flows into the second evaporator stage where a suspension 23 of metal sulfates in sulfuric acid, whose liquid phase consists of 50 to 65% sulfuric acid, is circulated through the heat exchanger 6 and the flash evaporator 4 by means of the pump 5. The heating medium in the second evaporator stage consists of the vapors 25 from the flash evaporator 1. The vapor condensate 26 leaving the heat exchanger 6 is discharged as effluent. Water is evaporated from the heated suspension 24 in the flash evaporator 4 at 60° to 120° C. and 30 to 100 mbar. In the third evaporator stage, the suspension 27 leaving the evaporator 4 is circulated through the heat exchanger 9 and flash evaporator 7 together with the suspension 28 by means of the pump 8. The heat exchanger 9 is heated with steam 30, and condensate 31 is produced. In the evaporator 7, the heated suspension 29 is concentrated to a sulfuric acid content of 60 to 82% by weight (in the liquid phase) at 80° to 150° C. and 30 to 100 mbar. Part 32 of the concentrated suspension of metal sulfate in sulfuric acid is discharged from the evaporator system into an immersion receiver 33. Subsequent treatment for the removal of metal sulfates and recovery of the sulfuric acid may be carried out, for example, in accordance with EP-A 133 505.

The vapors 34 from the flash evaporator 4 and the vapors 35 from the flash evaporator 7 are together condensed in the condenser 10. Condensation is carried out by direct contact with the cooling medium 37 which is at a temperature of at most 40° C. The cooling medium 37 introduced into the condenser 10 and the vapor condensate together with all the metal sulfates and sulfuric acid droplets discharged from the flash evaporators leave the condenser (as substance stream 36) at a temperature higher by 2° to 20° C. than that of substance stream 37. This liquid 36 is conveyed by the pump 11 into the flash evaporator 12 in which a quantity of water corresponding to the quantity of vapors condensed in condenser 10 is evaporated with cooling of the liquid. Sulfuric acid and metal sulfates are left in the liquid which is used again as cooling medium 37. The concentrations of $H_2SO_4$ and $MeSO_4$ in the cooling medium can be adjusted by the introduction of water 38 into the circulating stream 36 and discharge of a corresponding quantity 39 of cooling medium 37. The concentration of sulfuric acid is adjusted according to the invention to less than 30% by weight in order to avoid crystallization of metal sulfates. This discharged sulfuric acid 39 containing metal sulfates is preferably returned to the evaporator system together with the waste acid 17. If necessary, the vapors 41 released in the evaporator 12 are passed through a mist eliminator 40 in which sulfuric acid droplets free from solids can easily be separated.

Condensation of the vapors 41 free from droplets takes place in direct contact with cooling water 42 in the condenser 14. Cooling water and vapor condensate are discharged as almost uncontaminated effluent 43 into an immersion receiver 15.

Leakage air 45 is removed from the condenser 10 by means of the pump 13 and leakage air 44 is removed from the condenser 14 by means of the pump 16.

Alterations within the context of the present invention to the process variation illustrated here include, for example, omission of the third evaporator stage (evaporator 7, pump 8, heat exchanger 9) or the separate condensation of vapor from evaporator 4 and evaporator 7, in which case these evaporators may be operated at different pressures.

The advantages of the process according to the invention will now be illustrated with the aid of examples without being limited thereto.

COMPARISON EXAMPLE 32 t/h of waste acid 17 (see FIGURE) containing 24·6% by weight of $H_2SO_4$ and 12·8% by weight of $MeSO_4$ were fed into a three stage-forced circulation vacuum evaporator. In the first evaporator stage, which was heated with 5 bar steam 20, 7·65 t/h of water were evaporated at 120° C. and 0·9 bar (abs.). 24·35 t/h of acid 22 containing 32·3% by weight of $H_2SO_4$ and 16·8% by weight of $MeSO_4$ flowed from the first evaporator 1 into the second evaporator 4. The second evaporator stage was heated with the vapors 25 from the first evaporator stage. 8·1 t/h of water were evaporated in evaporator 4 at 85° C. and 50 mbar.

16·6 t/h of a suspension 27 containing 47·0% by weight of $H_2SO_4$ and 24·6% by weight of $MeSO_4$, mainly in solid form, flowed from the evaporator 4 into the third evaporator stage, which was also heated with 5 bar of steam 30. 0·8 t/h of water were evaporated in this evaporator at 88° C. and 50 mbar. 15·3 t/h of a suspension 32 containing 51·0% by weight of $H_2SO_4$ and 26·6% by weight of $MeSO_4$ were discharged from the evaporator 7. After cooling of the suspension 32, 67·8% sulfuric acid was separated from the metal sulfates as filtrate.

The vapors (34 and 35) from the second and third evaporator 4 and 7 were together condensed in an injection condenser which was fed with cooling water. The vapor condensate obtained at the rate of 8·95 t/h contained 72 kg of $H_2SO_4$ and 22 kg of $MeSO_4$. The vapors 25 from evaporator 1, which had been condensed in the heat exchanger 6 of the second evaporator stage, contained 10·2 kg of $H_2SO_4$ and 5·3 kg of $MeSO_4$ in 7·65 t of condensate.

A total of 1·05% of the sulfuric acid put into the process and 0·67% of the metal sulfates introduced entered the vapor condensate.

EXAMPLE

Vacuum evaporation was carried out as in the Comparison Example but with the following alterations according to the invention:

a) 400 kg per hour of cooling medium (substance stream 39 of the FIGURE) containing 18% by weight of $H_2SO_4$ and 5.5% by weight of $MeSO_4$ together with 50 g of a sulfonated fatty acid (Monopolöl ®, trade product of Stockhausen, Crefeld) as defoamant were added to the waste acid introduced into the system.

The consumption of steam 20 in the first evaporator stage was thereby increased by about 1.5%.

The vapor condensate 26 leaving the heat exchanger 6 contained only 1.2 kg of $H_2SO_4$ and 0.6 kg of $MeSO_4$ and could be directly discharged as effluent.

b) The vapors 34 and 35 from the second and third evaporator 4 and 7 were introduced into the condenser 10 where they were condensed in direct contact with 800 m³/h of a metal sulfate-containing, 18% sulfuric acid 37 which was at a temperature of 32° C. Sulfuric acid 36 left the condenser 10 at the rate of 809 m³/h and at a temperature of 37° C. To this sulfuric were added 0.8 m³/h of water 38 (to which 50 g/h of Monopolöl ® had been added as defoamant) and the mixture was fed into the flash evaporator 12 by means of the circulating pump 11. In this evaporator, water was evaporated at a rate of 9.55 t/h under a pressure of 40 mbar and the circulating acid cooled down to 32° C. 400 kg/h of this cooled 18% acid were discharged as substance stream 39 as described under a) and returned to the first evaporator stage.

The vacuum in the evaporators 4 and 7 and in the condenser 10 was maintained at 50 mbar' by means of the vacuum pump 13.

The vapors 41 obtained in the flash evaporator 12 were introduced into condenser 14 by way of a wire mesh mist eliminator 40. 340 m³/h of cooling water 42 were introduced at a temperature of 13° C. into the condenser 14. The discharged cooling water and vapor condensate 43 was at a temperature of 28° C. and a pH of 6.8. No significant contamination by metal sulfates could be detected and the mixture of cooling water and vapor condensate could therefore be directly discharged as effluent. A pressure of 38 mbar was maintained in the condenser 14 by means of the vacuum pump 16.

When the process according to the invention was employed, the losses of sulfuric acid and metal sulfates by removal in the droplets discharged with the vapors were reduced from 1.05% to less than 0.05% of the sulfuric acid introduced and from 0.67% to less than 0.03% of the metal sulfates introduced.

It will be appreciated that the instant specification and claims are set forth by way of illustration and not limitation, and that various modifications and changes may be made without departing from the spirit and scope of the present invention.

What is claimed is:

1. A process for the recovery of sulfuric acid from waste acids containing metal sulfates comprising concentrating waste acids by evaporation in multi-stage vacuum evaporators to obtain a suspension of metal sulfates in sulfuric acid and separating the concentrated sulfuric acid from the suspension of the metal sulfates in sulfuric acid obtained in the process of evaporative concentration, the improvement comprising condensing water vapors from the evaporative concentration process charged with droplets of metal sulfate-containing sulfuric acid and solid metal sulfates as they leave the multi-state vacuum evaporators by directly contacting these droplets of metal sulfates and sulfuric acid containing water vapors in a condensator with cooled water vapor condensate containing sulfuric acid and dissolved metal sulfates wherein the cooling of these water vapor condensate which is circulated as cooling medium is carried out by the evaporation of water in a vacuum flash evaporator with concomitant concentration of the sulfuric acid and metal sulfates in the contaminated water vapor condensate.

2. A process according to claim 1, wherein the evaporatively concentrated contaminated water vapor condensate circulated as cooling medium between condensator and flash evaporator has a sulfuric acid concentration of from 1 to 30% by weight.

3. A process according to claim 1, further comprising removing the metal sulfate and sulfuric acid discharged together with the water vapors from the multi-stage vacuum evaporators from the cooling circulation system consisting of condensator and flash evaporator as a 1 to 30% sulfuric acid containing metal sulfates and returning same to the evaporators.

4. A process according to claim 1, further comprising adding a defoamant to the circulating cooling medium.

5. A process according to claim 1, further comprising passing the water vapors obtained in the flash evaporator in the process of cooling the cooling medium consisting of condensate water containing sulfuric acid and metal sulfates through one or more mist eliminators into a condenser charged with cooling agent.

6. A process according to claim 1, wherein the evaporatively concentrated contaminated water vapor condensate circulated as cooling medium has a sulfuric acid concentration of from 5 to 30% by weight.

7. A process according to claim 4, where the defoamant is either sulfonated fatty acids or tri-n-butyl phosphate.

8. A process according to claim 5, where mist eliminator is a wire mesh mist eliminator.

* * * * *